(12) United States Patent
Kahler et al.

(10) Patent No.: US 8,862,283 B2
(45) Date of Patent: Oct. 14, 2014

(54) MOTOR VEHICLE COMBINATION AND METHOD FOR OPERATING

(71) Applicant: GM Global Technology Operations LLC, Detroit, MI (US)

(72) Inventors: Peter Kahler, Nierstein (DE); Marten Wittorf, Ingelheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 3 days.

(21) Appl. No.: 13/711,337

(22) Filed: Dec. 11, 2012

(65) Prior Publication Data
US 2013/0158740 A1 Jun. 20, 2013

(30) Foreign Application Priority Data
Dec. 15, 2011 (DE) .......................... 10 2011 121 279

(51) Int. Cl.
| | |
|---|---|
| G06F 17/00 | (2006.01) |
| G01C 21/34 | (2006.01) |
| B60T 8/17 | (2006.01) |
| G01C 21/36 | (2006.01) |
| B60D 1/62 | (2006.01) |

(52) U.S. Cl.
CPC .............. *G06F 17/00* (2013.01); *B60T 8/1708* (2013.01); *G01C 21/34* (2013.01); *G01C 21/3688* (2013.01); *B60D 1/62* (2013.01)
USPC .............................................. 701/1; 340/431

(58) Field of Classification Search
CPC ............ B60D 1/62; B60D 1/64; B60D 1/665; H01R 2201/26; H01R 13/5213; H01R 31/065; G06F 17/00; B06T 8/1708; G01C 21/34; G01C 21/3688

USPC ............. 701/36, 1, 410; 439/35, 36; 340/431, 340/988
See application file for complete search history.

(56) References Cited

U.S. PATENT DOCUMENTS

| | | | | |
|---|---|---|---|---|
| 5,900,803 | A | * | 5/1999 | Politz et al. ................. 340/425.5 |
| 6,501,376 | B2 | * | 12/2002 | Dieckmann et al. .......... 340/479 |
| 7,825,782 | B2 | | 11/2010 | Hermann |
| 2005/0062590 | A1 | | 3/2005 | Lang et al. |
| 2008/0113522 | A1 | * | 5/2008 | Wagner ........................... 439/35 |
| 2009/0146846 | A1 | * | 6/2009 | Grossman ...................... 340/988 |

(Continued)

FOREIGN PATENT DOCUMENTS

| | | |
|---|---|---|
| DE | 19620555 A1 | 11/1997 |
| DE | 10033345 * | 1/2002 ............. B60Q 11/00 |

(Continued)

OTHER PUBLICATIONS

German Patent Office, Search Report for German Application No. 102011121279.9, dated Jul. 3, 2012.

*Primary Examiner* — Marthe Marc-Coleman
(74) *Attorney, Agent, or Firm* — Ingrassia Fisher & Lorenz, P.C.

(57) ABSTRACT

A motor vehicle combination is provided. The motor vehicle combination includes a towing vehicle. The towing vehicle is embodied as passenger car. In addition, the motor vehicle combination includes at least one trailer. The at least one trailer can be mechanically connected to the towing vehicle. In addition, the motor vehicle combination comprises a bidirectional communication unit, which is designed for exchanging data between the towing vehicle and the at least one trailer.

8 Claims, 5 Drawing Sheets

(56) References Cited

U.S. PATENT DOCUMENTS

2009/0219148 A1* 9/2009 Thomas et al. ............... 340/431
2009/0271078 A1* 10/2009 Dickinson ....................... 701/51
2010/0026084 A1* 2/2010 Risse et al. ..................... 303/89
2010/0029097 A1 2/2010 Burlak et al.
2011/0015809 A1* 1/2011 Hermann ........................... 701/2
2011/0160956 A1* 6/2011 Chung et al. ................... 701/36

FOREIGN PATENT DOCUMENTS

| DE | 10033345 A1 | 1/2002 | | |
|----|----|----|----|----|
| DE | 102008014101 A1 | 9/2008 | | |
| DE | 102007013400 A1 | 10/2008 | | |
| DE | 202009010272 U1 | 1/2010 | | |
| DE | 202009010272 | * | 2/2010 | ............. B60L 11/12 |

* cited by examiner

MOTOR VEHICLE COMBINATION AND METHOD FOR OPERATING

CROSS-REFERENCE TO RELATED APPLICATION

This application claims priority to German Patent Application No. 10 2011 121 279.9, filed Dec. 15, 2011, which is incorporated herein by reference in its entirety.

TECHNICAL FIELD

The application relates to a motor vehicle combination and a method for operating a motor vehicle combination.

BACKGROUND

From DE 10 2008 014 101 A1 a device and a method for the wireless vehicle combination is known. The device comprises a receiver, which is mounted in or on the vehicle and which is adapted for receiving data from a wireless transmitter, and a microprocessor which is in connection with the receiver and which is adapted for processing the data. The data have a standard format that is adapted so that it can be processed by the microprocessor and the data are provided for the reception by all vehicles which are located within a predetermined wireless range and which comprise microprocessors that can process the standard format of the data.

Therefore, it may be desirable to provide a motor vehicle combination and a method for operating a motor vehicle combination which make possible further improved utilization possibilities for the motor vehicle combination. In addition, other objects, desirable features and characteristics will become apparent from the subsequent summary and detailed description, and the appended claims, taken in conjunction with the accompanying drawings and this background.

SUMMARY

According to various teachings of the present disclosure, a motor vehicle combination comprises a towing vehicle, wherein the towing vehicle is embodied as passenger car. In addition, the motor vehicle combination comprises at least one trailer, wherein the at least one trailer can be mechanically connected to the towing vehicle. Furthermore, the motor vehicle combination comprises a bidirectional communication unit which is designed for exchanging data between the towing vehicle and the at least one trailer.

According to the mentioned exemplary embodiment, the motor vehicle combination makes possible the provision of further improved utilization possibilities through the provision of a bidirectional communication unit for exchanging data between the towing vehicle embodied as passenger car and the at least one trailer. Advantageously, this makes possible exchanging data between the passenger car and the at least one trailer and utilizing the exchanged data in the respective other part of the motor vehicle combination. Thus, the safety during an operation of the motor vehicle combination can be increased or further improved access possibilities to individual components of the motor vehicle combination can be provided for users.

In one exemplary embodiment, at least one control unit of the at least one trailer can be accessed from the towing vehicle and/or at least one control unit of the traction vehicle can be accessed from the at least one trailer by means of the bidirectional communication unit.

The at least one trailer is generally embodied as caravan. By means of the bidirectional communication unit data of the towing vehicle can thus be made available for example in particular for occupants of the caravan or data of the caravan can be made available in one example, for vehicle systems of the passenger car and/or for its occupants.

The at least one trailer can be designed as single-axle trailer or as trailer with dual axle having a wheel base of typically less than about 80 cm.

In an exemplary embodiment, the bidirectional communication unit is designed for the wire-based exchanging of data between the towing vehicle and the at least one trailer. This makes possible the provision of an operational connection between the towing vehicle and the at least one trailer, which is particularly cost-effective, energy-saving and little susceptible to malfunctioning.

The bidirectional communication unit in this case can be designed for exchanging data between the towing vehicle and the at least one trailer via an energy supply line. Such a data transmission unit is also designated DLAN (direct LAN) wherein a data signal is modulated onto the energy supply line and demodulated by a receiving unit. An energy supply line that is already present for the at least one trailer can therefore be used for the exchange of the data between the towing vehicle and the at least one trailer, so that no additional data line is required.

In another exemplary embodiment, the bidirectional communication unit is designed for exchanging data between the towing vehicle and the at least one trailer via at least one line of a plug connection between the towing vehicle and the at least one trailer. For example, contacts or pins of a trailer socket that are not assigned can be provided as interface for exchanging the data.

In another exemplary embodiment, the bidirectional communication unit is designed for the wireless exchanging of data between towing vehicle and the at least one trailer. In one example, the exchange of the data between the towing vehicle and the at least one trailer can be effected by means of high-frequency signals, for example according to a standard of the IEEE 802.11-family such as WLAN. The mentioned exemplary embodiment makes possible a substantially flexible arrangement of transmitting and receiving units of the bidirectional communication unit in that the signal transmission can be effected in a wireless manner.

At least one vehicle system of the towing vehicle can be in one example, adapted as a function of transmitted data of the at least one trailer. The at least one vehicle system in this case is for example a drive control system, an energy management system or a driver assistance system of the passenger car. Thus, the operation of the respective vehicle system can be adapted to the current circumstances of the motor vehicle combination in an improved manner in that data of the trailer are taken into account for the vehicle system.

In another exemplary embodiment, a communication between occupants of the towing vehicle and occupants of the at least one trailer can be additionally carried out by means of the communication unit.

The application furthermore relates to a method for operating a motor vehicle combination according to one of the mentioned exemplary embodiments. Here, the method comprises the following. A starting of the towing vehicle and a determining if a mechanical connection exists between the towing vehicle and the at least one trailer takes place. If it is determined that there is a mechanical connection between the towing vehicle and the at least one trailer, a transmitting of data of the at least one trailer to the towing vehicle by means of the communication unit and an adapting of at least one vehicle system of the towing vehicle as a function of the transmitted data take place.

The method according to the mentioned exemplary embodiment in turn makes possible the provision of improved utilization possibilities which were already explained in connection with the motor vehicle combination according to the application.

Furthermore, a transmitting of data of the towing vehicle to the at least one trailer can be carried out by means of the communication unit in the case that it is determined that there is a mechanical connection between the towing vehicle and the at least one trailer. Thus, data of the towing vehicle can be provided for the trailer for example for occupants of a trailer designed as caravan.

The transmitting of the data of the towing vehicle to the at least one trailer can in one example, include a transmitting of data of at least one information and entertainment system and/or or a mobile radio system of the towing vehicle to the at least one trailer. Thus, an access to the mentioned systems and the at least one trailer is made possible. For example, occupants of a trailer designed as caravan can thus access the mentioned systems of the towing vehicle.

In another exemplary embodiment of the method, at least one parameter is additionally determined that is selected from the group comprising dimensions of the at least one trailer, a mass of the at least one trailer and a current tire inflation pressure of at least one tire of the at least one trailer. The transmitting of the data of the at least one trailer in this exemplary embodiment includes a transmitting of the at least one determined parameter and the at least one vehicle system is adapted as a function of the at least one determined parameter. This makes possible a further improved operation of the towing vehicle in that parameters of the trailer are taken into account through adapting one or a plurality of vehicle systems of the towing vehicle.

In addition, at least one travelling route can be determined for the motor vehicle combination by means of a navigation system and the determined travelling route transmitted to the towing vehicle and/or to the at least one trailer. For example, a travelling route can be determined by means of a navigation system that is arranged in the region of the at least one trailer, in one example, in the case that the trailer is designed as caravan, and the travelling route determined thus be transmitted to the towing vehicle.

The transmitting of the data of the towing vehicle to the at least one trailer and/or the transmitting of the data of the at least one trailer to the towing vehicle includes a transmitting of data of a computer network in a further configuration of the method. The access to an internet access of the towing vehicle for example is thus made possible from the at least one trailer, for example to occupants of a caravan.

In another exemplary embodiment of the method, image data are additionally determined by means of an optical camera arranged in the region of the towing vehicle and the determined image data transmitted to the at least one trailer. Additionally or alternatively, image data can be determined by means of an optical camera arranged in the region of the at least one trailer and the determined image data transmitted to the towing vehicle. Image data taken for example by a front camera of the towing vehicle can thus be provided for occupants of the at least one trailer or a rear view of the motor vehicle combination taken from the at least one trailer can be made available for the towing vehicle, in one example, during a parking operation.

The transmitting of the data of the towing vehicle to the at least one trailer and/or the transmitting of the data of the at least one trailer to the towing vehicle can additionally include a transmitting of access authorization data to the at least one trailer. Thus, an access control system for example to a trailer designed as caravan can access such data.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
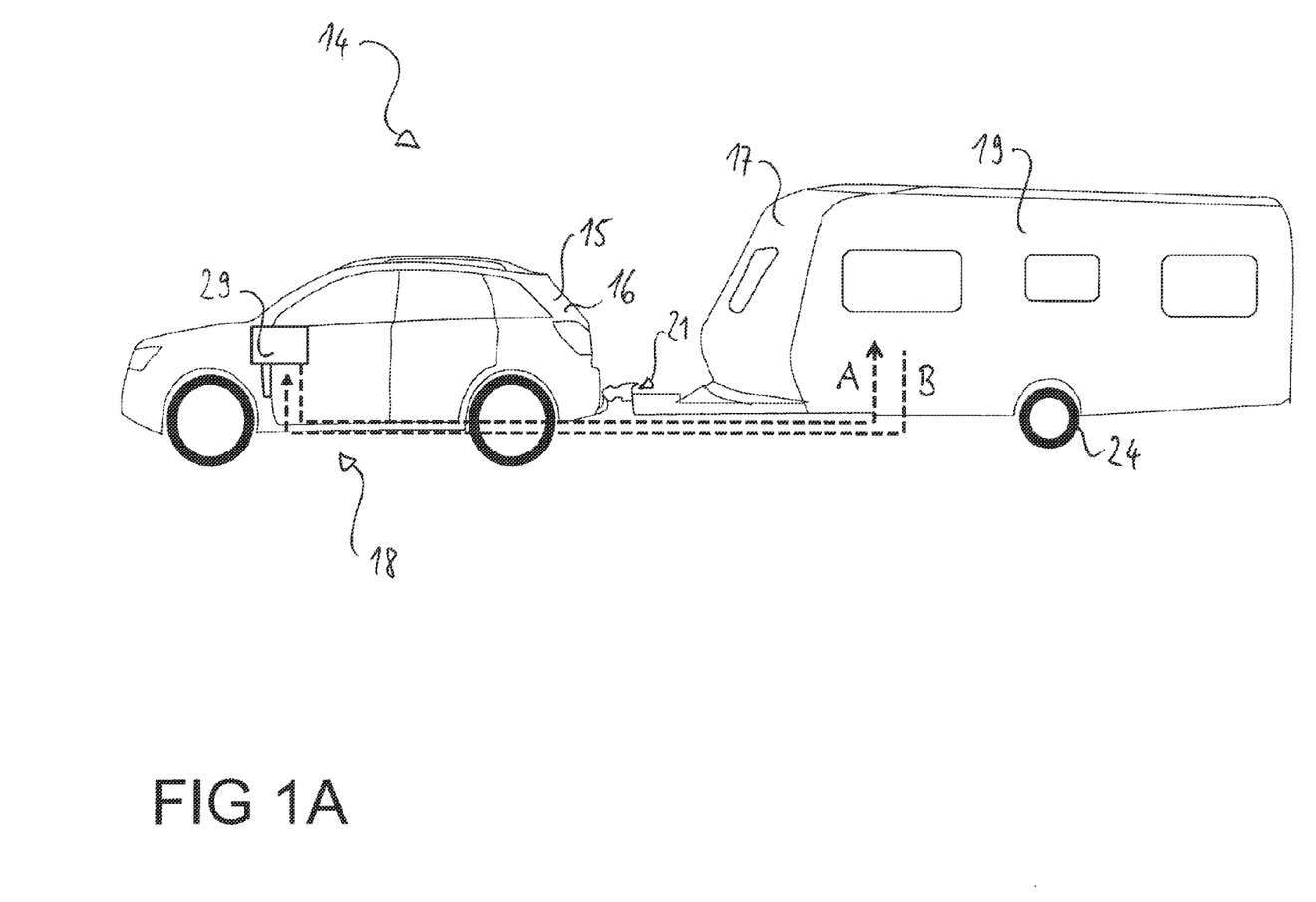
FIG. 1A shows a motor vehicle combination according to an exemplary embodiment of the application.

FIG. 1A shows a motor vehicle combination 14 according to an exemplary embodiment of the application.

The motor vehicle combination 14 comprises a towing vehicle 15, wherein the towing vehicle 15 is embodied as passenger car 16. In addition, the motor vehicle combination 14 comprises a trailer 17, wherein the trailer 17 is mechanically connected to the towing vehicle 15 via a connection 21. The trailer 17, in the shown exemplary embodiment, is designed as single-axle caravan 19. The caravan 19 includes for example seats or berths which are not shown in more detail for occupants of the caravan 19 and can in addition comprise in one example, a cooking recess as well as further facilities for the occupants.

In addition, the motor vehicle combination 14 comprises a schematically represented bidirectional communication unit 18, which is designed for the exchanging of data between the towing vehicle 15 and the trailer 17. In FIG. 1A, this is represented by means of an arrow A for data transmitted from the towing vehicle 15 to the trailer 17 and by means of an arrow B for data transmitted from the trailer 17 to the towing vehicle 15. Furthermore, a transmitting and receiving device 29 for the exchange of the data between the towing vehicle 15 and the trailer 17 is shown in FIG. 1A, wherein the transmitting and receiving device 29 is arranged in the region of the towing vehicle 15.

By means of the bidirectional communication unit 18, navigation data, data of an information and entertainment system of the passenger car 16, audio and/or video data, internet information and information for active safety systems as well as for control or regulating systems of the passenger car 16 can for example be transmitted to the caravan 19 and vice versa, as is explained in more detail in connection with the following Figures.

Thus, vehicle systems of the passenger car 16 can be utilized by the trailer 17 such as music, video, a driving dynamic control system and further safety systems or information of the trailer 17 can be transmitted to the towing vehicle 15, for example size, weight, tire pressure and filling levels. Vehicle information and vehicle systems can thus be utilized by the trailer 17 and information and systems of the trailer 17 can be utilized by the towing vehicle 15. For example, a current tire inflation pressure of at least one tire 24 of the trailer 17 can be determined by means of a sensor which is not shown in more detail and transmitted to one or a plurality of vehicle systems of the passenger car 16 by means of the bidirectional communication unit 18.

Figure 1B:
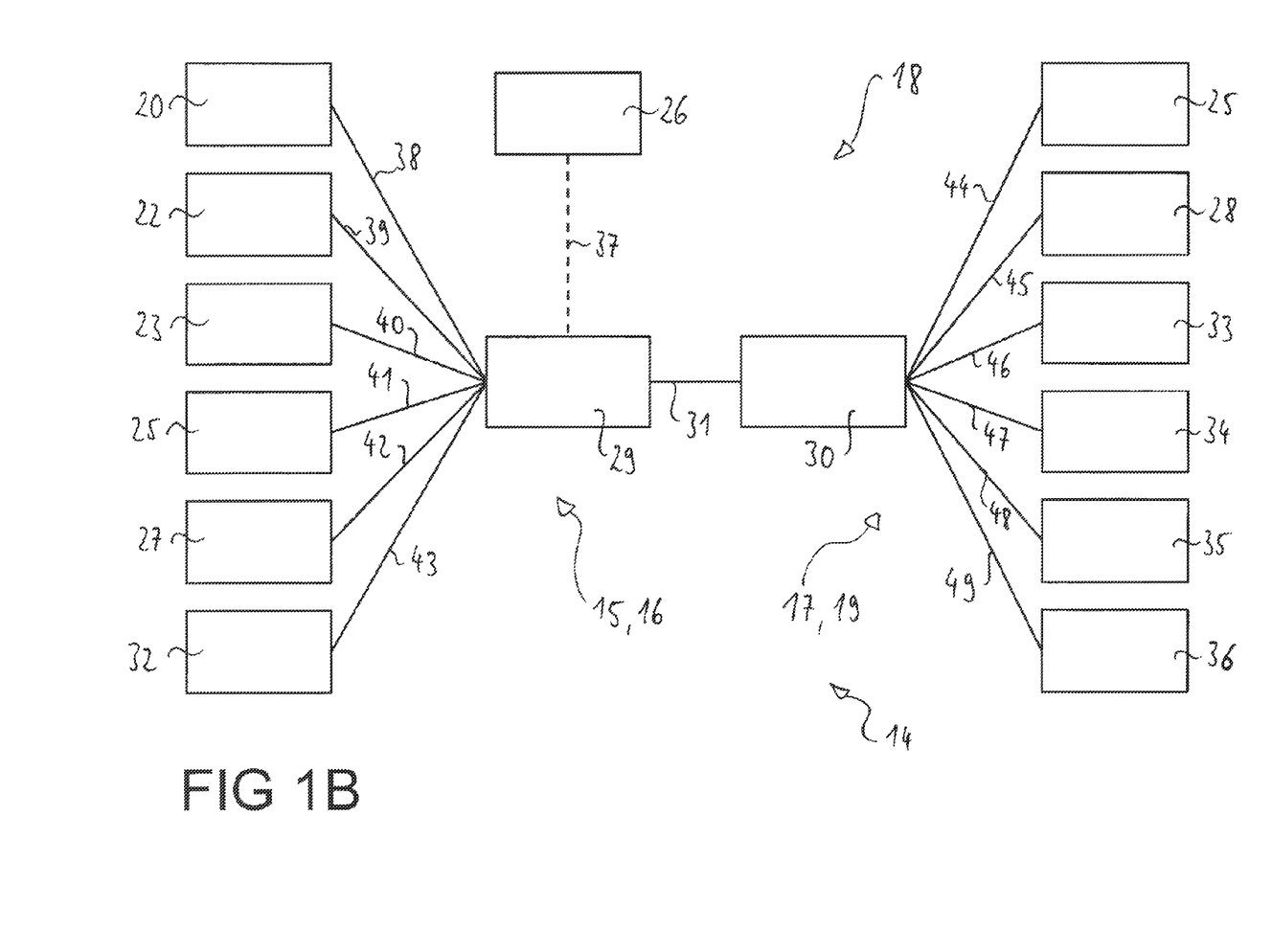
FIG. 1B shows components of the motor vehicle combination shown in FIG. 1A.

FIG. 1B shows components of the motor vehicle combination 14 shown in FIG. 1A. The towing vehicle 15 in the form of a passenger car 16 and the trailer 17 designed as caravan 19 in this case are merely schematically shown for the sake of clarity. Components having the same functions as in FIG. 1A are marked with the same reference characters and are not explained again in the following.

In addition to the transmitting and receiving device 19 of the towing vehicle 15, the communication unit 18 of the motor vehicle combination 14 comprises a transmitting and receiving device 30 which is arranged in the region of the trailer 17. The transmitting and receiving device 29 is in a schematically represented operational connection 31 with the transmitting and receiving device 30, wherein the operational connection 31 can be of a wire-based and/or wireless design.

The transmitting and receiving device 29 is connected to at least one vehicle system 20 of the towing vehicle 15 embodied as passenger car 16. The at least one vehicle system 20 in this case can be adapted as a function of transmitted data of the trailer 17. For example, information such as the size of the trailer 17, its weight and tire pressure as well as the position of the center of gravity of the trailer 17 can be used for a chassis adaptation of the towing vehicle 15 and/or for the determining of the remaining range of the towing vehicle 15. Furthermore, the at least one vehicle system 20 can be accessed from the trailer 17 by means of the bidirectional communication unit 18. For example, the at least one vehicle system 20 can be utilized or programmed for the caravan operation.

The transmitting and receiving device 29 is additionally connected to an information and entertainment system 22 of the passenger car 16 via a signal line 39. Thus, music and video streaming can for example be comfortably utilized from the caravan 19.

Furthermore, the transmitting and receiving device 29 is connected to a mobile radio system 23 of the passenger car 16 via a signal line 40. Thus, access to the mobile radio system 23 is also possible from the caravan 19.

Furthermore, the transmitting and receiving device 29 is connected to a navigation system 29 via a signal line 41 and to an optical camera 29 of the passenger car 16 via a signal line 42. The optical camera 27 can for example form a front camera of the passenger car 16 and record image data continuously or on request. The corresponding video material can be transmitted to the trailer 17 by means of the communication unit 18 and thus be viewed from said trailer 17.

Furthermore, the transmitting and receiving device 29 is connected to an output device 32 of the passenger car 16 via a signal line 43. Thus, data transmitted from the trailer 17 can be output in the passenger car 16. The output device 32 is designed for example to act as visual and/or acoustic output device.

Furthermore, the transmitting and receiving device 29 is connected to a computer network 26 arranged outside the passenger car 16 via a schematically represented operational connection 37, wherein for example an internet access can be provided for the passenger car 16. This internet access can be shared with the trailer 17 by means of the bidirectional communication unit 18, for example via a WLAN connection or a wire-based connection, as is explained in more detail in connection with the following Figures.

The transmitting and receiving device 30 of the trailer is connected to a navigation system 25 that is arranged in the region of the caravan 19 via a signal line 44. Thus, a user or occupant of the caravan 19 can easily determine a travelling route for the motor vehicle 15 from the caravan 19, for example a travelling route for the next day. In addition, a preview of the destination can be made available to the occupants of the caravan 19 via the internet access of the passenger car 16.

Furthermore, the transmitting and receiving device 30 is connected to an optical camera 28 arranged in the region of the caravan 19 via a signal line 45. The optical camera 28 in this case can supply a rear view of the motor vehicle combination 40 and in one example, can be realized by means of a camera of a mobile telephone arranged in a rearward window of the caravan 19. Because of this, image data for example for a parking operation of the motor vehicle combination 14 can be provided in the towing vehicle 15.

Furthermore, the transmitting and receiving device 30 is connected to an output device 33 which is arranged in the region of the caravan 19 via a signal line 46. Because of this, data received by the towing vehicle 15 can be output in the caravan 19 by means of the output device 33. The output device 33 to this end is designed for example as visual and/or acoustic output device.

Furthermore, the transmitting and receiving device 30 is connected to at least one sensor 34 of the trailer 17 via a signal line 47. The at least one sensor 34 can for example be designed for determining a current tire inflation pressure of at least one tire of the trailer 17. Thus, data of the trailer 17 can for example be provided for the vehicle system 20 of the passenger car 16 and/or output in the passenger car 16 by means of the output device 32.

In addition, the transmitting and receiving device 30 is connected to a storage device 35 of the trailer 17 via a signal line 48, wherein on the storage device 35 data of the trailer 17, for example its size and/or weight are stored. The mentioned data of the trailer 17 can likewise be provided in one example, for the vehicle system 20 of the passenger car 16 via the communication unit 18.

In addition to this, the transmitting and receiving device 30 is connected to an access control system 36 of the caravan 19 via a signal line 49. Because of this, the access can be authorized in one example, for trailers or caravans of a hiring pool, for the purpose of which for example data of the towing vehicle 15 are transmitted to the caravan 19.

Figure 2A:
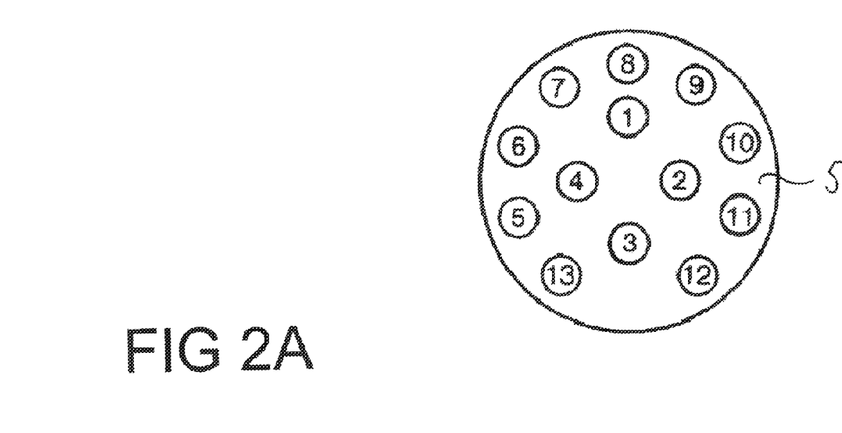
FIG. 2A shows a plug connection of a bidirectional communication unit according to an exemplary embodiment.

FIG. 2A shows a plug connection 50 of a bidirectional communication unit according to an exemplary embodiment which is not shown in more detail.

The plug connection 50 is part of a wire-based connection between the towing vehicle and the trailer and in the shown embodiment designed as trailer socket comprising the contacts or pins 1 to 13.

The assignment of the contacts in the shown exemplary embodiments is such that pin 1 is provided for a left driving direction indicator, pin 2 for a fog tail lamp, pin 3 for a ground of the pins 1 to 8, pin 4 for a right driving direction indicator, pin 5 for a right tail lamp, pin 6 for a brake lamp and pin 7 for a left tail lamp of the trailer. Furthermore, pin 8 is provided for a reversing lamp, pin 6 for a power supply or a continuous voltage + and pin 10 for a charging line of a trailer battery that is likewise provided and pin 13 for a ground of the pins 9 to 12. By means of at least one of the remaining pins 11 and 12, a wire-based bidirectional communication unit can thus be provided between the towing vehicle and the trailer.

In another exemplary embodiment, the bidirectional communication unit is designed for exchanging data between the towing vehicle and the trailer via an energy supply line. This is also designated DLAN.

Figure 2B:
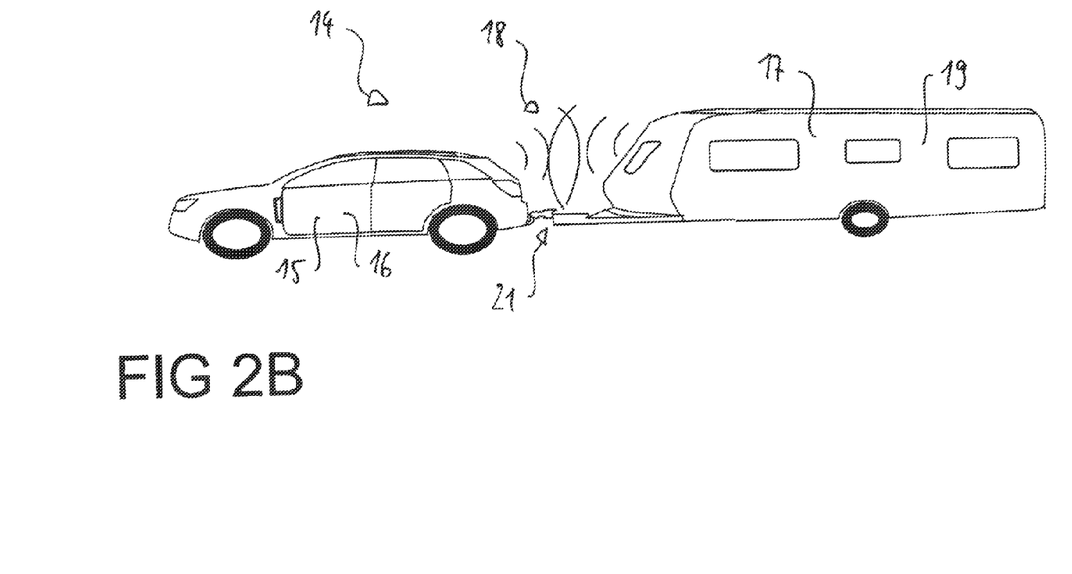
FIG. 2B shows a bidirectional communication unit according to another exemplary embodiment.

FIG. 2B shows a communication unit 18 of a motor vehicle combination 14 according to a further exemplary embodiment. Components having the same functions as in the preceding Figures are marked with the same reference characters and are not explained again in the following.

The bidirectional communication unit 18 in the shown embodiment is designed for the wireless exchanging of data between the towing vehicle 15 and the trailer 17, wherein an operational connection between the towing vehicle 15 and the trailer 17 is provided for example by means of a WLAN-connection.

Figure 3:
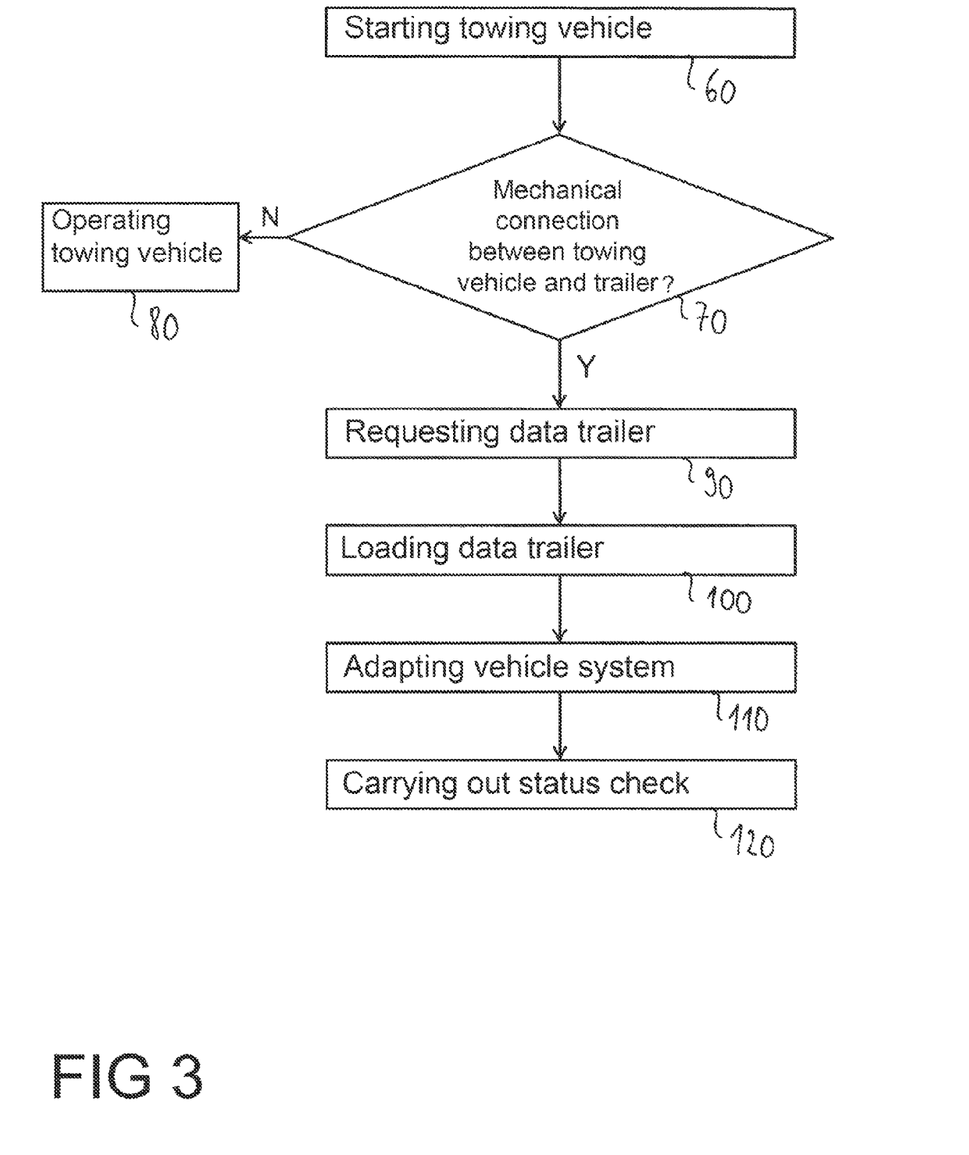
FIG. 3 shows a flow diagram of a method for operating a motor vehicle combination according to an exemplary embodiment of the application.

FIG. 3 shows a flow diagram of a method for operating a motor vehicle combination according to an exemplary embodiment of the application.

Here, a starting of the towing vehicle, for example in the form of an actuating of a starter motor of the passenger car takes place in 60.

In 70 it is determined if there is a mechanical connection between the towing vehicle and the at least one trailer, i.e. it is determined if a trailer is connected to the towing vehicle.

If in the process it is determined that no trailer is connected to the towing vehicle, no data is exchanged, as is schematically shown by means of 80.

If, by contrast, it is determined that there is a mechanical connection between the towing vehicle and the at least one trailer, i.e. it is determined that a trailer is connected to the towing vehicle, a requesting of data of the trailer takes place in 90.

For example, identification data of the trailer such as size, weight, tire inflation pressure, presence of a separate trailer battery, brake information, possibilities of a data storage in the trailer, an availability of sensors, for example of a camera and/or of ultrasound sensors, and filling levels, for example waste water of a caravan are requested. In addition it can be queried if systems such as an active stabilization, an active control and/or an active drive of the trailer are present. Furthermore, status information such as the opening state of windows and/or doors of the trailer or information regarding the position of a likewise present satellite receiving device of the trailer can be requested. In one example, it can be queried if the doors of the trailer are closed.

The requested data are loaded into the towing vehicle in 100, i.e. a transmitting of data of the trailer to the towing vehicle by means of the bidirectional communication unit takes place.

In 110, at least one vehicle system of the towing vehicle is adapted as a function of the transmitted data. For example, vehicle settings or parameters such as range information, engine cooling and further engine parameters are adjusted or determined. Furthermore, information for driver assistance systems of the passenger car can be provided, in one example, for a navigation system.

During the further operation of the motor vehicle combination, a typically continuous status check of the trailer takes place, i.e. a repeated requesting and loading of data of the at least one trailer, as is schematically shown with 120.

Figure 4:
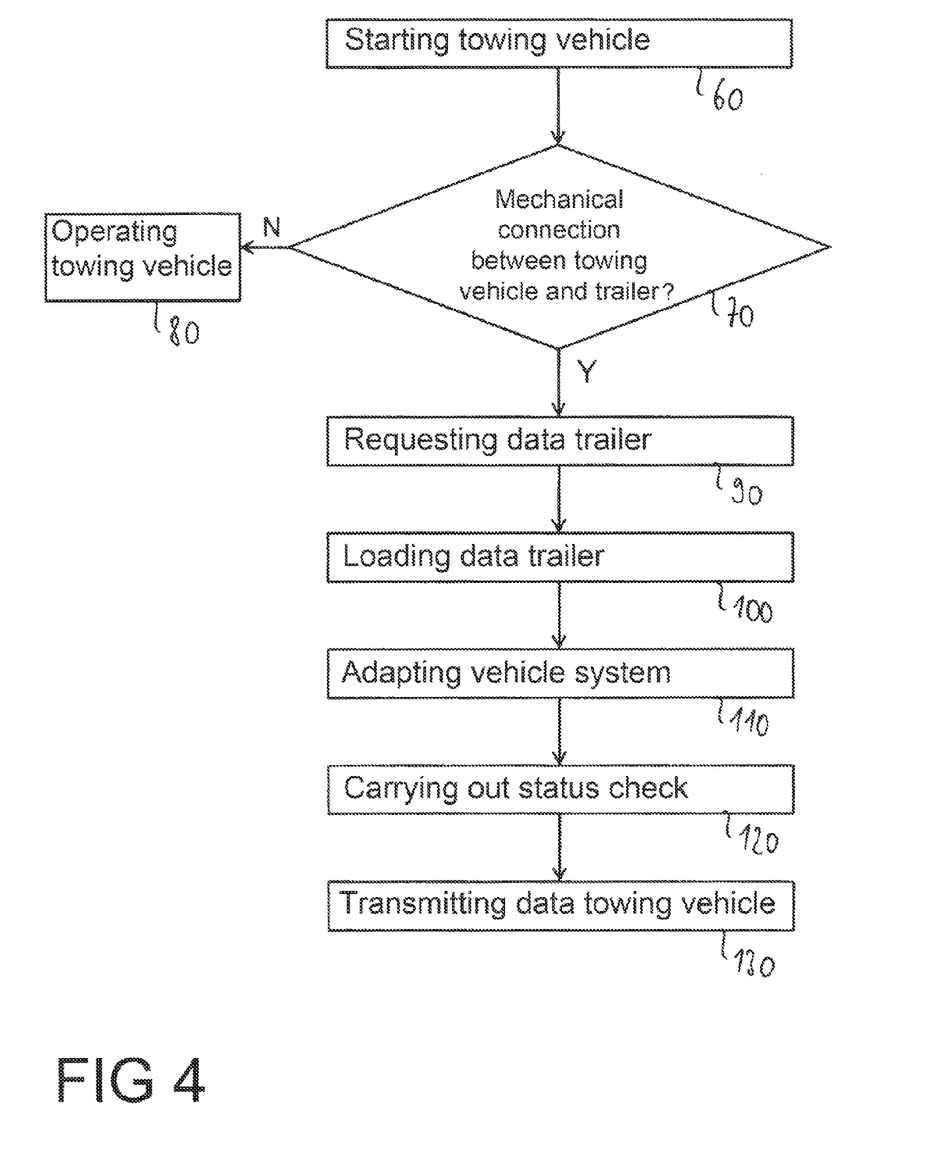
FIG. 4 shows a flow diagram of a method for operating a motor vehicle combination according to another exemplary embodiment of the application.

FIG. 4 shows a flow diagram of a method for operating a motor vehicle combination according to another exemplary embodiment of the application.

In 60, the towing vehicle is started and in 70 it is determined if there is a mechanical connection between the towing vehicle and at least one trailer.

If there is no connection, i.e. no trailer is connected, no data is transmitted as is shown with 80.

If by contrast it is determined that there is a mechanical connection between the towing vehicle and the at least one trailer, data of the trailer are requested in 90. This is effected corresponding to the block 90 of the exemplary embodiment shown in FIG. 3.

In addition, the requested data of the trailer are loaded into the towing vehicle in 100 and at least one vehicle system of the towing vehicle adapted as a function of the transmitted data in 110. The blocks 100 and 110 in this case correspond to the blocks 100 and 110 of the exemplary embodiment shown in FIG. 3.

During the further operation of the motor vehicle combination, a status check of the trailer is for example carried out continuously, as is represented with 120.

In addition, a transmitting of data of the towing vehicle to the at least one trailer by means of the bidirectional communication unit takes place in the shown embodiment in 130. The transmitting of the data of the towing vehicle to the at least one trailer can include in this case a transmitting of data of at least one information and entertainment system, of a mobile radio system and/or of a navigation system of the towing vehicle. In addition, image data taken by an optical camera arranged in the region of the towing vehicle can be transmitted to the at least one trailer.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for operating a motor vehicle combination, comprising:
   starting a towing vehicle,
   determining if there is a mechanical connection between the towing vehicle and at least one trailer,
   transmitting of data from the at least one trailer to the towing vehicle by means of a communication unit in response to the mechanical connection being determined,
   wherein the transmitting of the data from the towing vehicle to the at least one trailer further comprises transmitting of data of at least one of an information and entertainment system and a mobile radio station from the towing vehicle to the at least one trailer, and
   adapting at least one vehicle system of the towing vehicle as a function of the transmitted data.

2. The method according to claim 1, further comprising:
  determining at least one parameter selected from the group comprising dimensions of the at least one trailer, a mass of the at least one trailer and a current tire inflation pressure of at least one tire of the at least one trailer,
  wherein the transmitting of the data of the at least one trailer includes a transmitting of the at least one determined parameter and the at least one vehicle system is altered as a function of the at least one determined parameter.

3. The method according to claim 2, further comprising:
  determining at least one travelling route for the motor vehicle combination by means of a navigation system,
  wherein the determined travelling route is transmitted to at least one of the towing vehicle and the at least one trailer.

4. The method according to claim 3, wherein at least one of the transmitting of the data of the towing vehicle to the at least one trailer and the transmitting of the data of the at least one trailer to the towing vehicle further comprises transmitting of data of a computer network.

5. The method according to claim 4, further comprising:
  determining image data by means of an optical camera arranged in the region of the towing vehicle; and
  transmitting the determined image data to the at least one trailer.

6. The method according to claim 4, further comprising:
  determining image data by means of an optical camera arranged in the region of the at least one trailer; and
  transmitting the determined image data to the towing vehicle.

7. The method according to claim 5, wherein the transmitting of the data of the towing vehicle to the at least one trailer further comprises:
  transmitting of access authorization data to the at least one trailer.

8. The method according to claim 6, wherein the transmitting of the data of the at least one trailer to the towing vehicle further comprises:
  transmitting of access authorization data to the at least one trailer.

* * * * *